US012626003B2

(12) United States Patent
Gjerdrum et al.

(10) Patent No.: US 12,626,003 B2
(45) Date of Patent: May 12, 2026

(54) POLICY BASED COMPLIANCE ENFORCEMENT IN A FEDERATED GRAPH

(71) Applicant: Microsoft Technology Licensing, LLC, Redmond, WA (US)

(72) Inventors: Anders Tungeland Gjerdrum, Tromsø (NO); Iqra Ali, Tromsø (NO); Theodoros Gkountouvas, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 18/651,499

(22) Filed: Apr. 30, 2024

(65) Prior Publication Data

US 2025/0335624 A1      Oct. 30, 2025

(51) Int. Cl.
*G06F 21/62*          (2013.01)
*G06F 16/2453*          (2019.01)
(Continued)

(52) U.S. Cl.
CPC .... *G06F 21/6227* (2013.01); *G06F 16/24542* (2019.01); *G06F 16/285* (2019.01); *G06F 16/9024* (2019.01)

(58) Field of Classification Search
CPC ............... G06F 21/6227; G06F 16/285; G06F 16/24542; G06F 16/9024
See application file for complete search history.

(56) References Cited

U.S. PATENT DOCUMENTS

2006/0248592 A1    11/2006  Agrawal
2017/0041296 A1 *    2/2017  Ford ...................... G06F 21/64
(Continued)

FOREIGN PATENT DOCUMENTS

WO          2023091418 A1      5/2023

OTHER PUBLICATIONS

Endris, et al., "BOUNCER: Privacy-aware Query Processing Over Federations of RDF Datasets", accessed on link https://www.repo.uni-hannover.de/bitstream/handle/123456789/3494/camera-ready.pdf, Nov. 20, 2008, 15 pages.

(Continued)

*Primary Examiner* — Kristie D Shingles
(74) *Attorney, Agent, or Firm* — NovoTechIP International PLLC

(57)          ABSTRACT

A method for implementing policy-based compliance enforcement in a federated graph data environment including receiving a query from a query caller for data stored in a graph data storage system, the query including one or more components that are mapped to data entities of the graph data storage system using a schema. The schema expresses connections between data entities of the graph data storage system and includes data classification labels for the data entities of the graph data storage system. Each of the components of the query is examined to identify components to which a policy applies, the identification being done based on the data classification labels. Upon identifying the components, selecting between multiple policy enforcement modes that include reporting violation of the policy, denying query plans in violation of the policy and generating a transformed query plan that complies with the policy. Depending upon the selection, generating the query plan and generating a report that details violation of the policy, preventing execution of the query plan and generating the report that details violation of the policy or generating a transformed query plan.

17 Claims, 5 Drawing Sheets

100 ⟍

(51) Int. Cl.
  *G06F 16/28*   (2019.01)
  *G06F 16/901*   (2019.01)

(56)       References Cited

U.S. PATENT DOCUMENTS

| | | | | |
|---|---|---|---|---|
| 2018/0357444 | A1 | 12/2018 | Kammath | |
| 2021/0012029 | A1 | 1/2021 | Gustafsson | |
| 2021/0319128 | A1 | 10/2021 | Salomon | |
| 2022/0012364 | A1 | 1/2022 | Lafever | |
| 2024/0346421 | A1* | 10/2024 | Eberlein | G06Q 10/0637 |
| 2025/0259085 | A1* | 8/2025 | Crabtree | G06F 21/602 |

OTHER PUBLICATIONS

Kumaraguru, et al., "A Survey of Privacy Policy Languages", Proceedings of the 3rd Symposium on Usable Privacy and Security, Jan. 2007, 4 pages.

* cited by examiner

300 ⌐

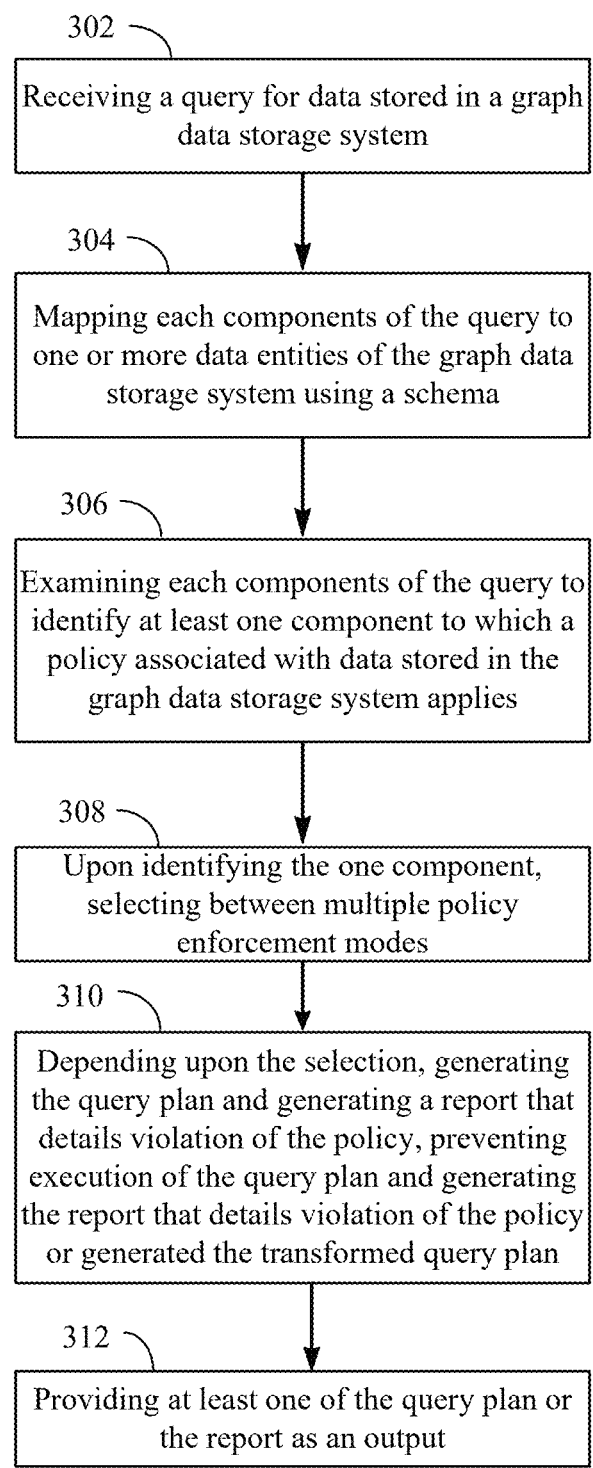

302 ⌐

Receiving a query for data stored in a graph data storage system

304 ⌐

Mapping each components of the query to one or more data entities of the graph data storage system using a schema

306 ⌐

Examining each components of the query to identify at least one component to which a policy associated with data stored in the graph data storage system applies

308 ⌐

Upon identifying the one component, selecting between multiple policy enforcement modes

310 ⌐

Depending upon the selection, generating the query plan and generating a report that details violation of the policy, preventing execution of the query plan and generating the report that details violation of the policy or generated the transformed query plan

312 ⌐

Providing at least one of the query plan or the report as an output

FIG. 3

POLICY BASED COMPLIANCE ENFORCEMENT IN A FEDERATED GRAPH

BACKGROUND

Large software companies often make use of a graph storage data infrastructure to store various types of data for and/or about their customers. Graph data may be stored in a plethora of different physical storage systems and is often only semantically connected. The data is stored in a variety of different storage systems and the graph environment often provides a data infrastructure that can be accessed for retrieving many different types of data. The data stored in the graph storage data environment may include confidential, private or otherwise sensitive customer data and may be stored in a variety of different geographical locations. Various customers or services receive access to the graph data by making queries to the graph storage data environment. This is often done through a graph query application programming interface (API) that enables various customers or services to submit a query to the graph environment for access to the data stored in the graph storage data infrastructure.

Upon receiving a graph query through the API, a graph query execution framework functions by determining what data is requested, identifying which of the physical storage systems are candidates for retrieving this data, and then generating an optimized query plan that takes various constraints such as cost, latency, reliability and the like into consideration for executing the query. However, when the query requires access to data that is stored in different storage systems and/or is subject to different policies and regulations, determining how the data in the various storage systems is related, and/or whether or not access should be granted to the data is a complex and resource intensive process.

Hence, there is a need for improved systems and methods of ensuring compliance with policies in a federated graph environment.

SUMMARY

In one general aspect, the instant disclosure describes a data processing system having a processor and a memory in communication with the processor, where the memory comprises executable instructions that, when executed by the processor, cause the data processing system to perform multiple functions. These functions include receiving a query for data stored in a federated graph data storage system, where the query is received from a query caller via an intelligent query Application Programming Interface (API), the query includes one or more components and the federated graph data storage system includes a plurality of data stores, at least some of the plurality of data stores being disconnected. The functions also mapping each of the components of the query to one or more data entities of the graph data storage system using a schema, the schema expressing connections between data entities of the graph data storage system and the schema including data classification labels for the data entities of the graph data storage system. Each of the components of the query are then examined, via a detection engine, to identify one of the components to which a policy associated with data stored in the graph data storage system applies, the identification being done at least based on the data classification labels associated with the data entities mapped to the components. Upon identifying the component, making a selection between multiple policy enforcement modes, the multiple policy enforcement modes including at least one of reporting violation of the policy, denying query plans in violation of the policy and generating a transformed query plan that complies with the policy. Depending upon the selection, at least one of generating the query plan and generating a report that details violation of the policy, preventing execution of the query plan and generating the report that details violation of the policy, or generating the transformed query plan is performed. The query plan, the transformed query plan or the report is then provided as an output. Generating the transformed query plan includes at least one of pruning the data entity subject to the policy from the query plan and implementing a declassifying function in the query plan which transforms the data entity to which the policy applies in a manner that a classification label of the data entity changes to a lower level classification label which complies with the policy.

In another general aspect the instant disclosure describes a method for implementing policy-based compliance enforcement in a federated graph data environment. The method includes storage system including a plurality of data stores, at least some of the plurality of data stores being disconnected. Each of the components of the query are then mapped to one or more data entities of the graph data storage system using a schema, the schema expressing connections between data entities of the graph data storage system and the schema including data classification labels for one or more of the data entities of the graph data storage system. Each of the components of the query are examined, via a detecting engine, to identify at least one component to which a policy associated with data stored in the graph data storage system applies, the identification being done at least based on the data classification labels associated with the data entities mapped to the one or more components. Upon identifying the component, making a selection between multiple policy enforcement modes, the multiple policy enforcement modes including at least one of reporting violation of the policy, denying query plans in violation of the policy and generating a transformed query plan that complies with the policy. Depending upon the selection, performing one of generating the query plan and generating a report that details violation of the policy, preventing execution of the query plan and generating the report that details violation of the policy, or generating the transformed query plan. Generating the transformed query plan comprises at least one of pruning the data entity subject to the policy from the query plan and implementing a declassifying function in the query plan which transforms the data entity to which the policy applies in a manner that a classification label of the data entity changes to a lower level classification label which complies with the policy.

In yet another general aspect, the instant disclosure describes a non-transitory computer readable medium on which are stored instructions that when executed cause a programmable device to perform functions of receiving a query for data stored in a federated graph data storage system, the query being received from a query caller via an intelligent query Application Programming Interface (API), the query including one or more components and the federated graph data storage system including a plurality of data stores, at least some of the plurality of data stores being disconnected. Each of the components of the query are mapped to one or more data entities of the graph data storage system using a schema, the schema expressing connections between data entities of the graph data storage system and the schema including data classification labels for one or more of the data entities of the graph data storage system.

Each of the components of the query are examined, via a detecting engine, to identify at least one of the one or more components to which a policy associated with data stored in the graph data storage system applies, the identification being done at least based on the data classification labels associated with the data entities mapped to the one or more components. Upon identifying the component, making a selection between multiple policy enforcement modes, the multiple policy enforcement modes including at least one of reporting violation of the policy, denying query plans in violation of the policy and generating a transformed query plan that complies with the policy. Depending upon the selection, performing one of generating the query plan and generating a report that details violation of the policy, preventing execution of the query plan and generating the report that details violation of the policy, or generating the transformed query plan. At least one of the query plan, the transformed query plan or the report is provided as an output. Generating the transformed query plan comprises at least one of pruning the data entity subject to the policy from the query plan and implementing a declassifying function in the query plan which transforms the data entity to which the policy applies in a manner that a classification label of the data entity changes to a lower level classification label which complies with the policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is a flow diagram showing an example method for implementing policy-based compliance enforcement in a federated graph data environment.

DETAILED DESCRIPTION

Figure 1:
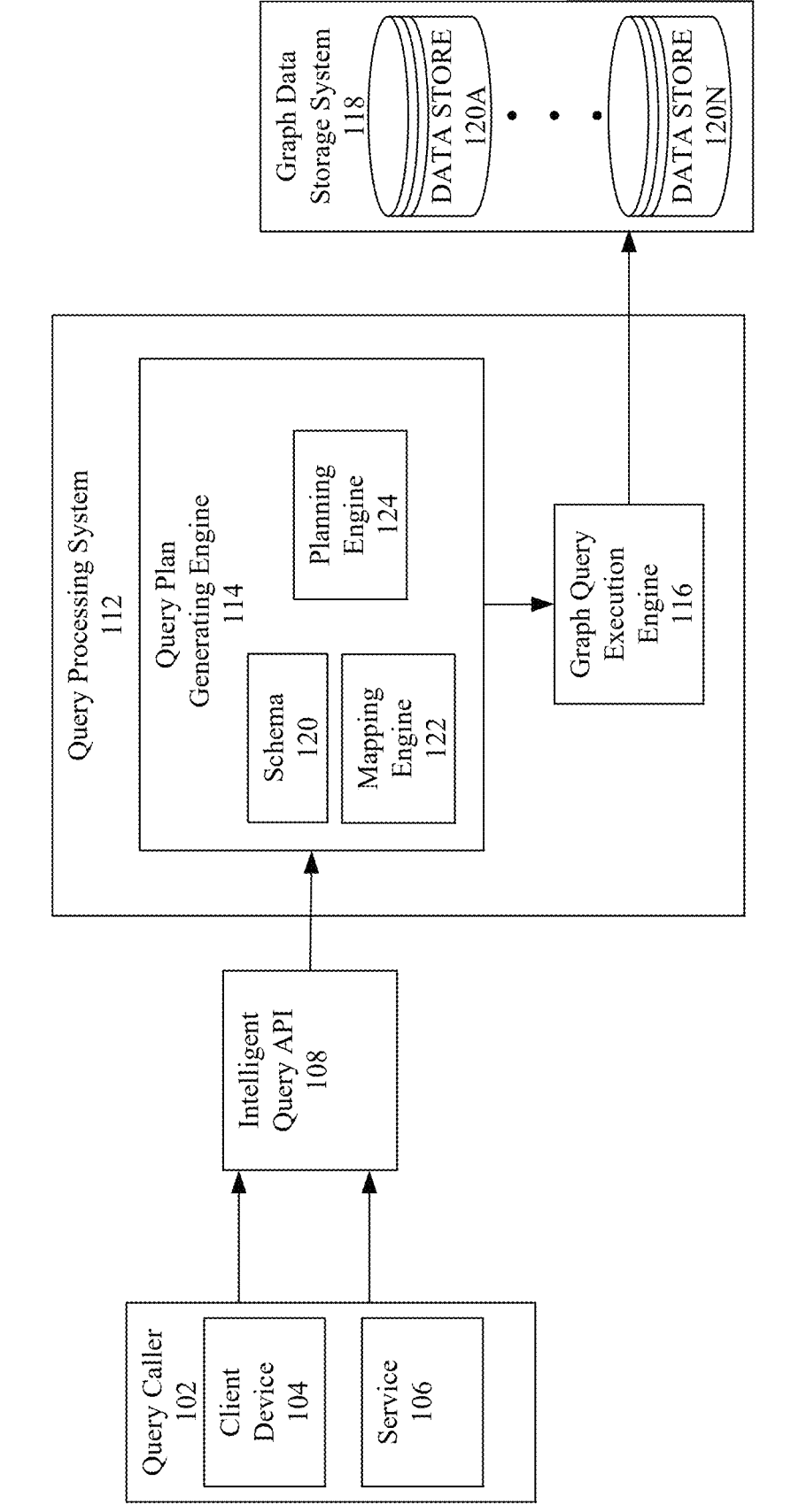
FIG. 1 illustrates an example system upon which aspects of this disclosure may be implemented.

In an enterprise setting, productivity workflows are often centered around objects of collaboration. Examples of objects of collaboration include a chat/email thread, a document, or tickets in domain specific task management systems. These enterprise objects often exhibit a relational structure describing the interdependency between people and such objects. A relational model such as a Resource Description Framework (RDF) model, or a graph representation is often used to answer questions about these interdependencies. Some software development companies provide productivity services that offer services to millions of users and store data objects in a variety of different geographic or virtual storage spaces. An example of such a productivity service is the Microsoft M365® suite of products that serves over 300 million Daily Active Users (DAU), distributed between consumer and enterprise subscribers. Some of the largest tenants of such services span millions of users connected in a single coherent graph structure. Relationships in these types of graphs describe workflow-oriented connections between enterprise users and workflow objects, answering questions such as documents modified around a user's immediate organization, or documents shared in a group that a user is a part of.

For many large software providers, signals describing interactions between users, tenants and various other entities (e.g., groups, organizations, documents, etc.) are stored in a collection of workload specific data stores that are designed to serve a specific category of requested traffic. The different data stores may use different partition and indexing techniques. These different data stores often make use of a variety of different physical data storage systems that may be located in different geographical locations. These data stores are often disconnected from one another. The different data stores may also store an overlapping set of content, both partially complete and subject to regional restrictions due to various compliance regulations such as General Data Protection Regulation (GDPR).

Users and services can access the data stored in these data stores by submitting a query to the graph data infrastructure. To ensure efficiency in processing the query, an optimized query execution plan is generated and used to execute the query against the data and retrieve the required results. In a graph data environment, where customer data is stored, there is a significant likelihood of sensitive data being included in the data retrieved in response to the query. Software providers such as Microsoft® are required to ensure that their computing platforms have mechanisms for safeguarding data security and privacy. This often involves compliance with certain data privacy rules, regulations and policies. For example, some governments and/or other entities have specific rules regarding transfer of data. In addition to restrictions that originate from laws and regulations, companies that store data often have contractual obligations to their customers to keep their data safe and secure. For example, some enterprises provide a Customer Key product that enables the customer to manage their own encryption keys for a fee. To ensure compliance with these governmental regulations and contractual obligations, organizations that store or transfer data are required to ensure the safety and security of specific types of data.

Different types of data have different sensitivity levels. For example, personal information is often highly confidential. To determine the sensitivity level, each piece of data is often associated with a specific data classification category. Example data classification categories include System Metadata, End User Pseudonymous Information (EUPI), and Customer Content (CC). Generally, system metadata can be stored and utilized without many restrictions, EUPI data has more restrictions. CC data is often governed by the strictest rules. In addition to different sensitivity levels, the duration for which data is being handled/stored impacts which obligations must be met, and which regulations need to be followed. Ensuring compliance with the many different rules, regulations and privacy guidelines in a federated data environment in which data is stored in different and often disconnected data stores is a challenging undertaking. When a query is issued for relational data that is stored in different data stores and/or is subject to different policies, determining how to process the query to present accurate results and still ensure that the results comply with policies that govern each group of data involved in generating the results is a complex process. Thus, there exists another technical problem of lack of efficient and accurate mechanisms for ensuring policy compliance when processing queries against a federated graph environment in which data is stored in different data stores.

To address these technical problems and more, in an example, this description provides a technical solution for providing policy-based compliance enforcement in a federated graph environment by using an intelligent query API and a federated query plan generating engine. The intelligent query API provides an interface that can process relational queries issued to a federated graph in a coherent and structured manner. In an example, the federated query plan generating engine generates plans based on various modes. One mode involves pruning the data items that are subject to policy restrictions (e.g. data classification) from the plan. For example, given a policy restricting End-User Identifiable Information (EUII), the generated query would prune the Name property from the response. This may be coupled with a report specifying what was pruned by the given query. Another mode involves a declassification function that can lower the data classification level of the data items. For example, a function capable of safely declassifying EUII data objects to EUPI data objects. Such declassification may hold the same properties as a cryptographically safe hash function. Thus, different enforcement regimes are used based on different factors such as policies that apply to the requested data (e.g., different regions). As a result, the technical solution makes use of a federated graph that provides relational data and an intelligent query API to process queries against data stored in a variety of different data stores and to ensure compliance with different policies applicable to the data.

The technical solution described herein addresses the technical problem of inefficiency of current graph query execution plan generating mechanisms in processing queries against a federated graph which is subject to different regional polices and regulations and stores data across different often disconnected data stores. The technical solution addresses technical challenges involved with ensuring policy compliance in complex federated graphs that store relational data across different data stores. The technical solution provides an efficient mechanism for processing queries that require access to data stored in a federated graph environment to generate relational query results while ensuring compliance with privacy and security restrictions related to handling of different data. This is achieved by implementing a three-tiered enforcement mode for maintaining safe transfers for multi region queries, where the three-tiered enforcement mode includes creation of policy violation reports, denying query plans in violation of policy, and transforming a plan into a policy conforming representation. Transforming the plan into a policy conforming representation can be achieved by pruning data items that are subject to policy restrictions from the plan or implementing a declassification function to allow data entities to transition their classification label into lower and/or allowed classifications. The technical advantage includes improving the operation of computing systems used for generating graph query execution plans, improving memory usage and reducing latency in processing graph queries. The technical effects at least include (1) improving the operation of computing systems by reducing the amount of network traffic and computing processing power needed to execute queries in a graph data environment; and (2) ensuring compliance with various policies efficiently when processing queries in a graph data environment.

FIG. 1 illustrates an example system 100, upon which aspects of this disclosure may be implemented. The system 100 includes a query caller 102, intelligent query API 108, and query processing system 112. Additionally, the system 100 includes a graph data storage system 118. The query processing system 112 includes a query plan generating engine 114 and a graph query execution engine 116. The graph data storage system 118 is a federated data storage system that includes a plurality of data stores 120A-120B. Each of the data stores 120A-120N may be a separate physical or virtual data store. In some implementations, each data store 120A-120N stores a different type of data. The data stores 120A-120N may be located in the same geographical region or may be in completely different geographical regions (e.g., different countries or continents). At least some of the data stores 120A-120N are physically disconnected. However, the Intelligent query API 108 provides an interface that semantically connects the disconnected data stores to provide a cohesive data infrastructure that can be accessed for retrieving the many different types of data stored in the various data stores of the graph data storage system 118.

Different users and/or systems may access and use the data stored in the graph data storage system 118 by making queries to the graph data storage system 118. The different users and systems who make queries to the graph data storage system 118 are referred to in this disclosure as query callers or callers. The query caller 102 includes a client device 104 and service 106 from which a query to the graph data storage system 118 may be received. The client device 104 represents a client device used by a user to submit a query to the graph data storage system. In addition to individual users, many services or systems may make use of data stored in a graph data storage system. For example, copilots such as large language models (LLMs) or other generative artificial intelligence models often submit queries to the graph data storage system 118. Thus, service 106 represents any cloud service, copilot or other system that can function as a query caller by submitting a query for data to the graph data storage system 118. FIG. 1 depicts only one client device 104 and service 106 for simplicity. In practice, graph queries may be received from many different client devices and services. The different client devices and services from which a query may be submitted may be located in many different geographical locations, which may be different from the locations of the intelligent query API 108, query processing system 112 and graph data storage system 118. The internal hardware structure of a client device and/or a server used to submit a query or execute other elements of system 100 is discussed in greater detail in regard to FIGS. 4 and 5.

Queries are submitted to the graph data storage system 118 via the intelligent query API 108, which is where the input queries enter the system. The intelligent query API 108 is an API that allows the query caller 102 to interact with and issue queries to the graph data storage system 118. As discussed above, intelligent query API 108 provides an interface to the query processing engine 112 through which the system can provide query results related to relational queries in a coherent and structured manner. In an example, the intelligent query API 108 functions as a layer that is capable of submitting a query against federated data that is stored in multiple data stores that are disconnected and/or data that needs to be treated differently. In an example, the intelligent query API 108 determines to which data stores the query should be submitted. As mentioned above, the graph data storage system 118 is required to ensure compliance with different data policies. For example, each of the data stores 120A-120N may be subject to various kinds of geo-distribution and data regionality. In an example, the Data Handling Standards (DHS) describe the policies for how data can be transferred between geographical regions for flows initiated by various query callers.

An example of rules governing data privacy is that while storage of system metadata is not restricted in most cases, storage of data that is considered confidential or private is often subject to more restrictive rules. Additionally, depending on the classification of data, different encryption requirements may apply. Furthermore, data may be subject to data retention/life-time requirements. Still further, specific organization (e.g., customer) policies may govern data transfer. Such policies could govern, for example, data transfers between logical regions (e.g., geographical regions) such as whether or not transfer of data from a specific region to another specific region is permitted. To ensure that system 100 adheres to these policies, the intelligent query API 108 and the query processing system 112 provide proper management of inter-region transfers of data across all data stores of the graph data storage system 118.

Identifying privacy rules that apply to a given query and processing the query based on such rules is a complex and computationally resource intensive task. This is particularly the case when the query relates to data stored in different data stores and/or subject to different policies. To ensure policy compliance and accuracy in providing relational data, the query processing system 112 makes use of different elements such as the query plan generating engine 114 and graph query execution engine 116.

The query plan generating engine 114 is responsible for generating a query plan for executing the query. The term "query plan" or "query execution plan" as used herein refers to a compiled query execution plan that provides information on how the received query should be executed in the graph data storage system 118. In some implementations, the query plan is an SQL server execution plan. In another implementation, the query plan includes instructions such as which Hypertext Transfer Protocol (HTTPs) calls to make. The query plan generating engine 114 may generate an execution plan that includes a query plan and an execution context. The query plan may be a read-only data structure that can be reused when cached. The execution context may be separate data structure that is only used for executing the query plan but is not cached. The query plan generating engine 114 may be a compiler that receives the query and generates the query plan as determined by the schema 120, mapping engine 122 and planning engine 124.

The schema 120 is a database schema that describes how data in the data storage system 118 relates to other data in the data storage system 118. In other words, the schema 120 is capable of expressing how different types of relationships and entities are connected. Furthermore, the schema 120 offers a manner of describing the individual classification labels (e.g., system metadata, customer content, etc.) assigned to schema objects, be it relationships, entities, or properties thereof. To enable the query plan generating engine 114 to properly identify, for a given query, the data that is subject to data transfer rules/policies, the graph schema 120 is enriched with a representation of accurate data classification labels for each node, relationship, and/or property of the graph data available for retrieval through intelligent query API 108. While the schema 120 is shown as being part of the query plan generating engine 114, the schema 120 may be determined and/or provided by the graph data storage system 118 and may be used by the by the query plan generating engine 114 in generating the query plan for a given query.

The mapping engine 122 makes use of the schema 120 to map the entities expressed in the query to a collection of objects in the schema 120. This involves parsing the input query which may be in the form of a query text to an expression tree and then mapping the variables expressed in the expression tree to individual data stores by using the schema 120. In an example, every variable in the expression tree of a given query is mapped to the schema, and thus to a data store. Thus, the mapping engine 122 utilizes the schema 120 to determine which data stores 120A-120N need to be used to respond to the query. In some implementations, the mapping engine 122 produces a set of tuples explaining the link between a given query pattern and its types, as defined by the schema.

Figure 2:
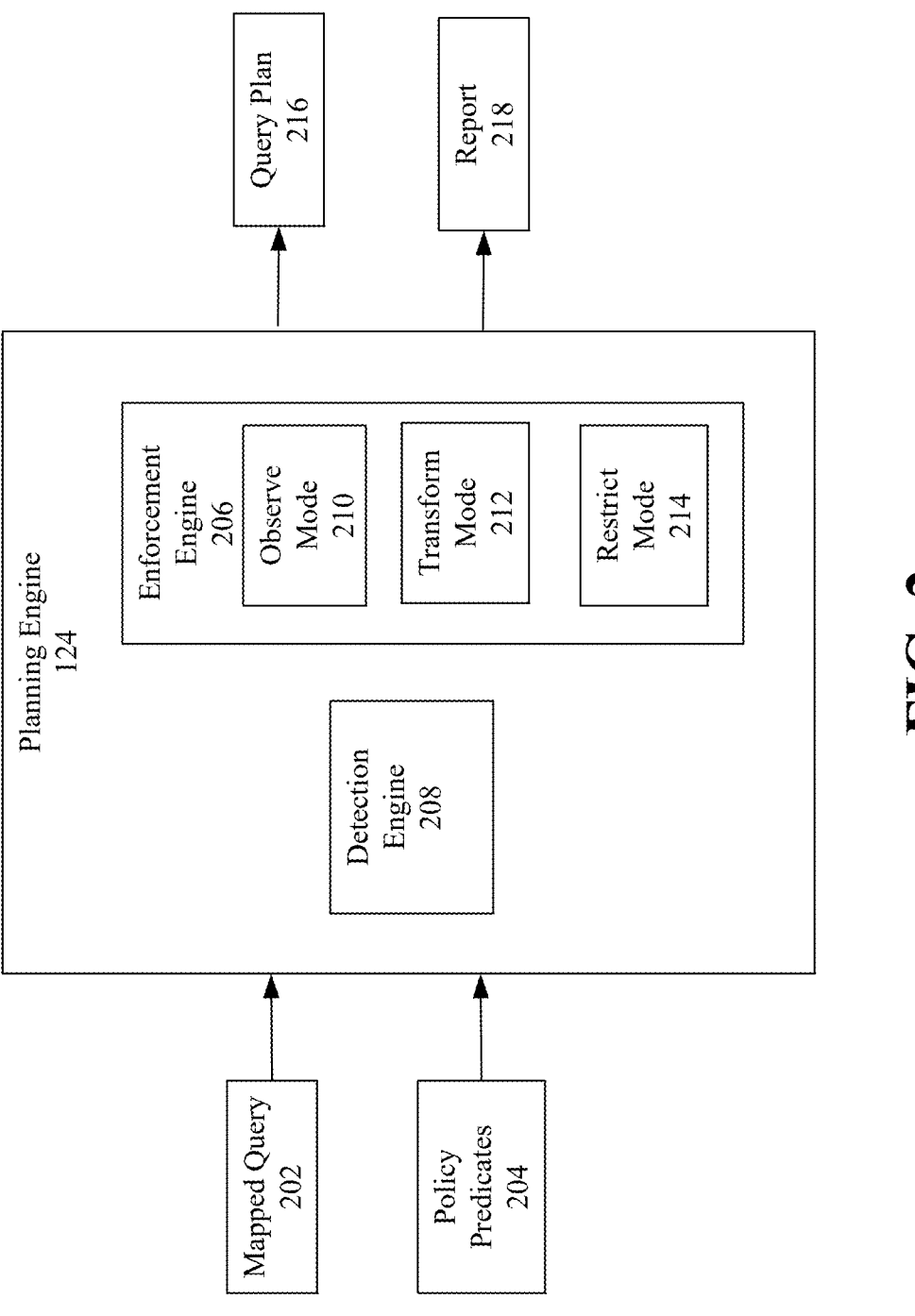
FIG. 2 is an example of data flow between some elements illustrated in and other elements used by the system illustrated in FIG. 1.

The planning engine 124 utilizes the mapped variables provided by the mapping engine 122, data classification labels provided by the schema 120 and policies appliable to the different classification labels to generate a query plan that complies with the required data policies, as discussed in more details in regard to FIG. 2. In an example, to enable federation across multiple geographical regions, the planning engine 124 needs information regarding the location of data items. For example, a store may be required by a specific policy (e.g., DHS) to store region restricted content within a specific geographic area. In order to take these restrictions into account, the planning process requires a complete representation of the candidate regions to generate a policy compliant execution plan across these regions. In some implementations, there are two core modes in which region information can be provided to the planning engine 124. One is a tenant mode, and the other is user mode or user-region mapping. The tenant mode implies that each tenant affinities with one or more regions, partitioned as such, per tenant. The user mode implies that the a user is affinized to a region.

The intelligent query API 108 provides the context a query needs to deduce the source region and target tenant. Based on this information, the query plan generating engine 114 determines the source region from which the query originated. With this information, a map of the regions assigned to that tenant can be generated. In some implementations if the region in which the query processing system is located is different from the source region of the query, the planning engine 124 also identifies the location of the query processing system 112. Furthermore, with information retrieved from the schema 120, the planning engine 124 can retrieve regional information about the target data stores of a given query and map the query context (e.g., tenant and user) to a regional endpoint for a given data store. The various regional information is used while generating the query plan to deduce which data is region-restricted and requires special treatment for retrieval and/or transfer to which regions. Moreover, the schema 120 is used to retrieve description of the mapping between the schema entities and their supported stores. These may partially overlap where similar data may be hosted in a collection of stores. Given that the individual patterns expressed in the query are properly mapped to their typed entities, as described in the schema, the planning engine 124 can then generate a plan to schedule information retrieval tasks to individual stores, and the subsequent conflation of these tasks.

Once a query plan has been generated, it is transmitted to the graph query execution engine 116, which is responsible for executing the query plan in the graph data storage system 118 to retrieve query results. As discussed in more detail in regard to FIG. 2, the query may ensure policy compliance in a variety of different modes. The graph query execution engine 116 may be a separate service and may be in a separate physical location than the remaining elements of the query processing system 112. In an example, the graph query execution engine 116 is part of the graph data storage system 118.

Various elements of the system 100 are connected to each other via a network (not shown). The network may be one or more wired or wireless networks or a combination of wired and wireless networks. The system 100 may be implemented in a single site or spread out in a number of facilities or geographically separated locations.

FIG. 2 is an example of data flow between some elements illustrated in and other elements used by the system illustrated in FIG. 1. As discussed above, each variable in the query is mapped to one or more entities of the schema to generate a mapped query. The mapped query 202 is transmitted to the planning engine 124 for processing. The detection engine 208 of the planning engine 124 receives the referenced objects of the mapped query and examines each specific component of the mapped query to detect if the specific query component is subject to any classification rules and regional restrictions. The detection engine 208 achieves this by identifying the classification labels assigned to each query component, examining the geographic locations assigned with the query caller and target data bases and then using the policy predicates 204 to determine if a specific policy applies to the query component (e.g., based on the georgical locations). The policy predicates 204 functions as a repository of policies applicable to the graph data storage system and may be stored in the graph data storage system or may be stored elsewhere. In some implementations, each policy predicate codifies one or more data policies in code. As such, policy predicates may be produced in code by defining which transfer operations are permitted on data items given varying data classification labels assigned to them. The detection engine 208 then utilizes the applicable policy predicates and identified classification labels to determine if a specific policy applies to one or more components of the mapped query 202. A simplified example of a detection process is provided in the pseudo code below:

```
METHOD Detect(StorePropertiesDictionary)
// Initialize an empty list to hold properties that are not allowed
for transfer
    PropertiesNotAllowedToTransfer = { }
    // Loop through each item in the StorePropertiesDictionary
    FOR EACH Store IN StorePropertiesDictionary
        IF Store IS ObjectStore
            Fetch Target from TRM
        ELSE IF
            Fetch Source from SUBSTRATE
        FOR EACH Item IN Store
        // Call method to check each item and the rules that apply
to it as per DHS
            IF PolicyPredicateCheck(Policy, DataClassification,
            Source, Target)
                DO NOTHING
```

10

-continued

```
        ELSE
            PropertiesSubjectToPolicyAction.Append(Item)
        RETURN PropertiesSubjectToPolicyAction
    END METHOD
```

In this manner, the detection engine 208 identifies the query components to which one or more policies apply and the appliable policies. This information is transmitted to the enforcement engine 206 for enforcing the identified policies in the query plan. In some implementations, the enforcement engine 206 receives the geographical maps associated with the data, affected data classification labels, the applicable policy predicate(s) and client/query processing system location as inputs and generates a query plan according to a selected enforcement mode as an output. The enforcement engine 206 utilizes various enforcement mechanisms for enforcing the identified policies. In some implementations, the enforcement engine 206 can select between three enforcement modes that include observe, transform and restrict.

As discussed above, a policy can be declared through a declarative special purpose policy language expressing rules and actions denoted by predicates and arrows that express the target actions. An example policy predicate is provided below.

```
(source eq APC|LATAM) &
(target eq EEA) & Any(x >= EUPI) => Deny!
```

This example policy declares that a query originating from regions APC and LATAM cannot transfer data from EEA, given a numerically ranked classification of EUPI or above. Given such an example policy, if the following example query is received:

```
MATCH(a:Profile) RETURN a.ObjectId, a.Name
and the applicable schema items include:
Profile
{
    ObjectId => EUPI
    Name => EUII
}
``` the detection engine detects that the policy applies to the query if either the query caller or middle tier location is within APAC or LATAM regions. The query enforcement engine 206 then determines which enforcement mode to select depending on one or more parameters.

The observe mode 210 involves creating a report that details the policy violation, providing a notification about the violation (e.g., surfacing an alert to a control pane or to the query caller), and generating the query plan as normal without making any changes that ensure policy compliance. Thus, the planning engine 124 generates the query plan 216 using the query language, while the enforcement engine 206 generates a report that outlines the policy violation. This provides a quick and computationally light mechanism for policy enforcement and may occur in situations where the query caller is a trustable query caller and is likely to take the appropriate action.

Another approach to enforcement is to transform the query plan via the transform mode 212 to ensure compliance with the applicable policies. Several options for transformations may exist, either through a declassification function or a pruned plan. In some implementations, the policy specification itself declares how the transformation should be achieved. A simplified form of transforming the query plan to ensure enforcement is to prune the items in the query plan that are subject to the specific policy (e.g., items subject to specific data classifications). For example, given a policy restricting EUII, the transform mode may indicate that the query plan is to prune the Name property from the response to the query. This may be coupled with a report specifying the items that were pruned by the given query.

Determining whether or not pruning should be applied may be based on a number of parameters. For example, for policies which classify identifier types or key columns restrictively, certain database indices may require pruning to avoid conflation of items keyed by these types, which can reduce the query's ability to produce responses correctly. Moreover, for policy-restricted properties that are part of a predicate statement, the predicate statement must be augmented to be exclusive. This implies that any statement certifying if something is true, given a policy restriction must be pruned to assert false. For example, the filter WHERE a. Name='Bob' would be pruned into a predicate always returning False, when it is subject to an EUII restrictive policy. Unless the predicate involves a disjunction (OR statement) the query will effectively prune all a for which the predicate applies. The following algorithm outlines an example prune enforcement policy action in pseudo code.

```
SWITCH (expression-type)
    CASE 'FilteredProperty':
    FOR EACH PropertyFilter in FilteredProperty.PropertyFilterList
        IF PropertyFilter EXIST IN PropertiesNotAllowedToTransfer
            REPLACE PropertyFilter WITH False:
    CASE 'LoadedProperty':
    FOR EACH Property in LoadedProperty.PropertyList
        IF Property EXIST IN PropertiesNotAllowedToTransfer
            REMOVE Property FROM PropertyList
    BREAK
END SWITCH
```

An alternative to pruning is utilizing a declassifying function to allow data entities to transition their classification labels to a lower form. For example, a policy prohibiting the transfer of EUII classified data entities may additionally provide a safe deidentify/declassify function to permit the transfer. In an example, a function capable of safely declassifying EUII labeled data entities to EUPI labeled data entities holds the same properties as a cryptographically safe hash function. This means that the declassification function operates in a similar manner as that of a cryptographically safe hash function to transform any sensitive data that is subject to a restrictive policy. As a result, the portion of the query results that is subject to the policy is transformed such that given the function output, it is computationally infeasible to produce the input or given a hash input, it is computationally infeasible to produce another input such that the outputs are equal. In this manner, the query plan is generated in a manner that enables the query results to be transferred while still complying with the applicable policy. Thus, declassifying functions can be implemented to avoid predicate exclusion and ensure that the predicates operate on the transformed values. One such example is equality comparison using a cryptographically safe hash function as defined above. Anther declassification function can produce aggregates of values which are differentially private when the sample sizes are large enough. Given the example policy predicate mentioned above, a declassifying action may be expressed in the policy language as follows:

```
(source eq APC|LATAM) & (target eq EAA) &
Any(x >= EUPI) => declassify("function-name", x)
```

In the above declassifying function, the function name expresses the pre-approved declassifying function. Thus, the declassifying option allows the implementation of a declassification function to allow data entities to transition their classification label into a lower form. The declassifying functions may be pre-approved functions which are identified in the policy predicates. Thus, by applying a declassifying function, the planning engine 124 can generate an alternative query plan which can be executed within the policy. As a result, by utilizing the transform mode 212, the planning engine 124 ensures that the query plan complies with the required policies.

In some instances, instead of observing the violation or transforming the query plan, the enforcement engine 206 utilizes the restrict mode 214 to prevent execution of the query plan and thus prevent possible noncompliance with the required policies. In some implementations, when it is determined that the restrict mode 214 applies to the query, the query plan is simply not generated. Instead, a report is generated for transmission to the query caller and/or other users describing the policy violation and indicating that the query cannot be processed. In alternative implementations, the query plan is generated before the enforcement engine 206 preempts the execution of the query plan.

Determining which enforcement mode to choose for a given query may depend on a number of variables. In some implementations, the enforcement mode is determined by the policy itself. For example, specific policies may identify the enforcement mode applicable to the policy (e.g., the enforcement mode is included in the policy predicate). In other implementations, there is a configuration setting for selecting the enforcement policy that applies to a given type of query. The configuration setting can be a setting that enables a developer to select which enforcement mode to apply to different queries in a given data environment. When the enforcement mode is observe or transform, the planning engine 124 proceeds to generate the query plan 216 for execution. When the transform mode is observe or restrict, in addition to generating the query plan, the enforcement engine 206 may also generate a report 218 for transmission to the query caller or other stakeholders.

FIG. 3 is a flow diagram showing an example method for implementing policy-based compliance enforcement in a federated graph data environment. In an example, one or more steps of method 300 are performed by a query processing system such as the query processing system 112 of FIG. 1.

Method 300 begins by receiving a query, at 302. The query is received from a query caller, which may be a client device of an individual user or a server that runs a service. The query is received via an intelligent query graph API and transmitted to the query processing system for processing and the query includes one or more components. After receiving the query, method 300 proceeds to map each of the one or more components of the query to one or more data entities of the graph data storage system using a schema, at 304. The schema expresses connections between data entities of the graph data storage system and the schema includes data classification labels for one or more of the data entities of the graph data storage system. In some implementations, mapping requires first creating an expression tree for each expression in the query. This may require parsing the query. Then each expression in the expression tree may be mapped to a data entity of the graph data storage system (e.g., to a target data store in the graph data storage system). By using the schema, a classification label associated with the data entity to which each expression is mapped is identified, thus detecting classification labels for the data sought via the query.

After mapping the components to the data entities, method 300 proceeds to examine each of the one or more components of the query to identify at least one of the one or more components to which a policy associated with data stored in the graph data storage system applies, at 306. The identification is done at least based on the data classification labels associated with the data entities mapped to the one or more components. The identification may be done via a detection engine of the query processing system. Identifying the at least one the one or more components may include determining if the components is subject to a regional restriction based on the policy. The policy may be expressed in a policy predicate produced in code which defines which transfer operations are permitted on data items given varying data classification labels assigned to the data items When a component of the query to which a policy applies is identified, method 300 proceeds to select between multiple policy enforcement modes, at 308. The multiple policy enforcement modes include reporting violation of the policy, denying query plans in violation of the policy and generating a transformed query plan that complies with the police. In some implementations, generating the transformed query plan includes either generating a pruned query plan or including a declassifying function in the query plan which transforms the data entity to which the policy applies in a manner that a classification label of the data entity changes to a lower level classification label which complies with the policy. Generating a pruned query plan includes removing the one or more components that are subject to the policy from the query plan.

Depending upon the selection, method 300 proceed to generate the query plan and generate a report that details violation of the policy, prevent execution of the query plan and generate the report that details violation of the policy or generate the transformed query plan, at 310. Depending on which enforcement mode is selected, method 300 then proceeds to provide at least one of the generated query plan or the generated report as an output, at 312. When the query plan is provided, the query is then executed to generate the results for the query. The results may then be transmitted to the query caller.

Figure 4:
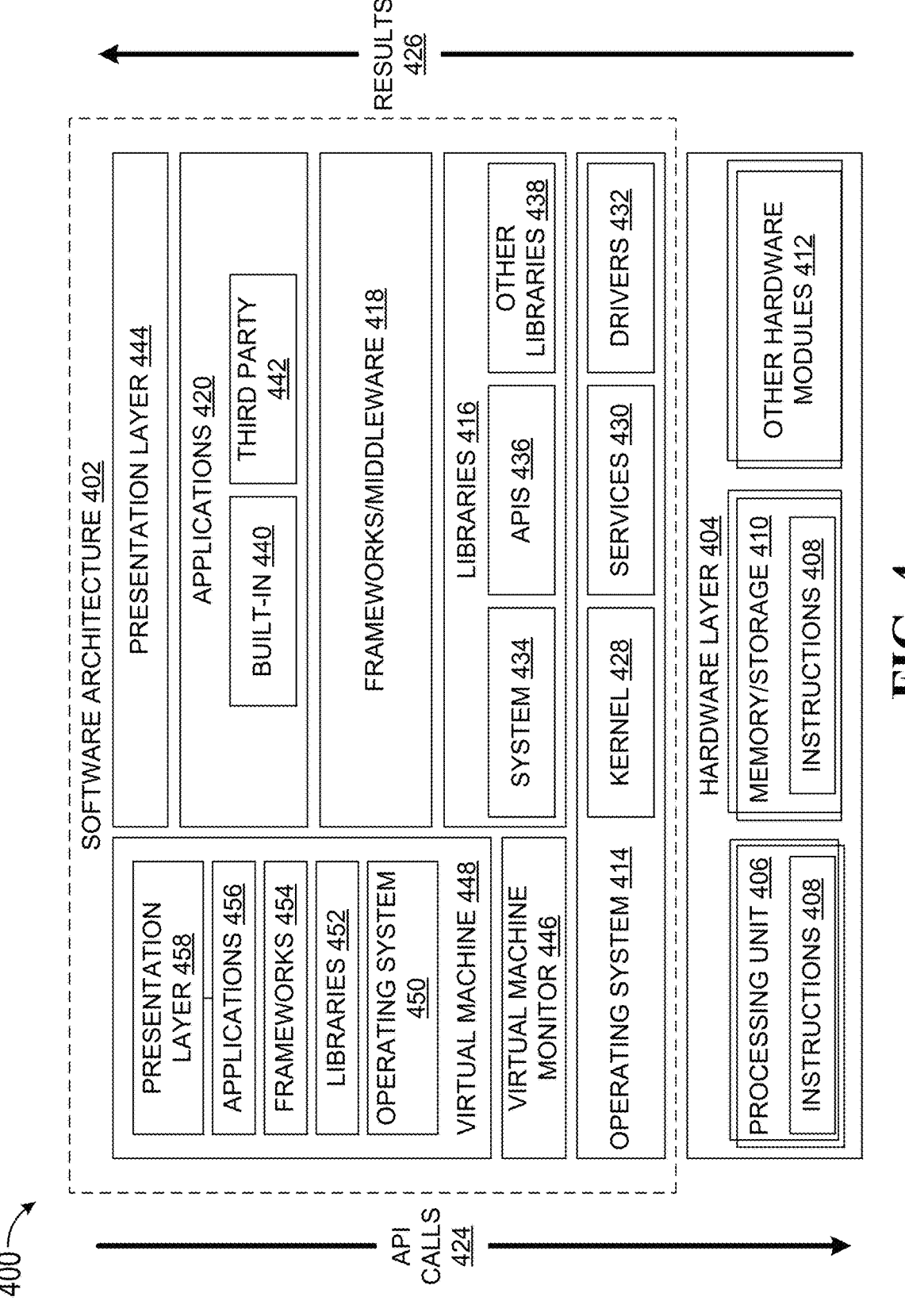
FIG. 4 is a block diagram illustrating an example software architecture, various portions of which may be used in conjunction with various hardware architectures herein described.

FIG. 4 is a block diagram 400 illustrating an example software architecture 402, various portions of which may be used in conjunction with various hardware architectures herein described, which may implement any of the above-described features. FIG. 4 is a non-limiting example of a software architecture, and it will be appreciated that many other architectures may be implemented to facilitate the functionality described herein. The software architecture 402 may execute on hardware such as client devices, native application provider, web servers, server clusters, external services, and other servers. A representative hardware layer 404 includes a processing unit 406 and associated executable instructions 408. The executable instructions 408 represent executable instructions of the software architecture 402, including implementation of the methods, modules and so forth described herein.

The hardware layer 404 also includes a memory/storage 410, which also includes the executable instructions 408 and accompanying data. The hardware layer 404 may also include other hardware modules 412. Instructions 408 held by processing unit 406 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular system. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine depicted in block diagram 500 of FIG. 5, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 450, libraries 452, frameworks 454, applications 456, and/or a presentation layer 458.

Figure 5:
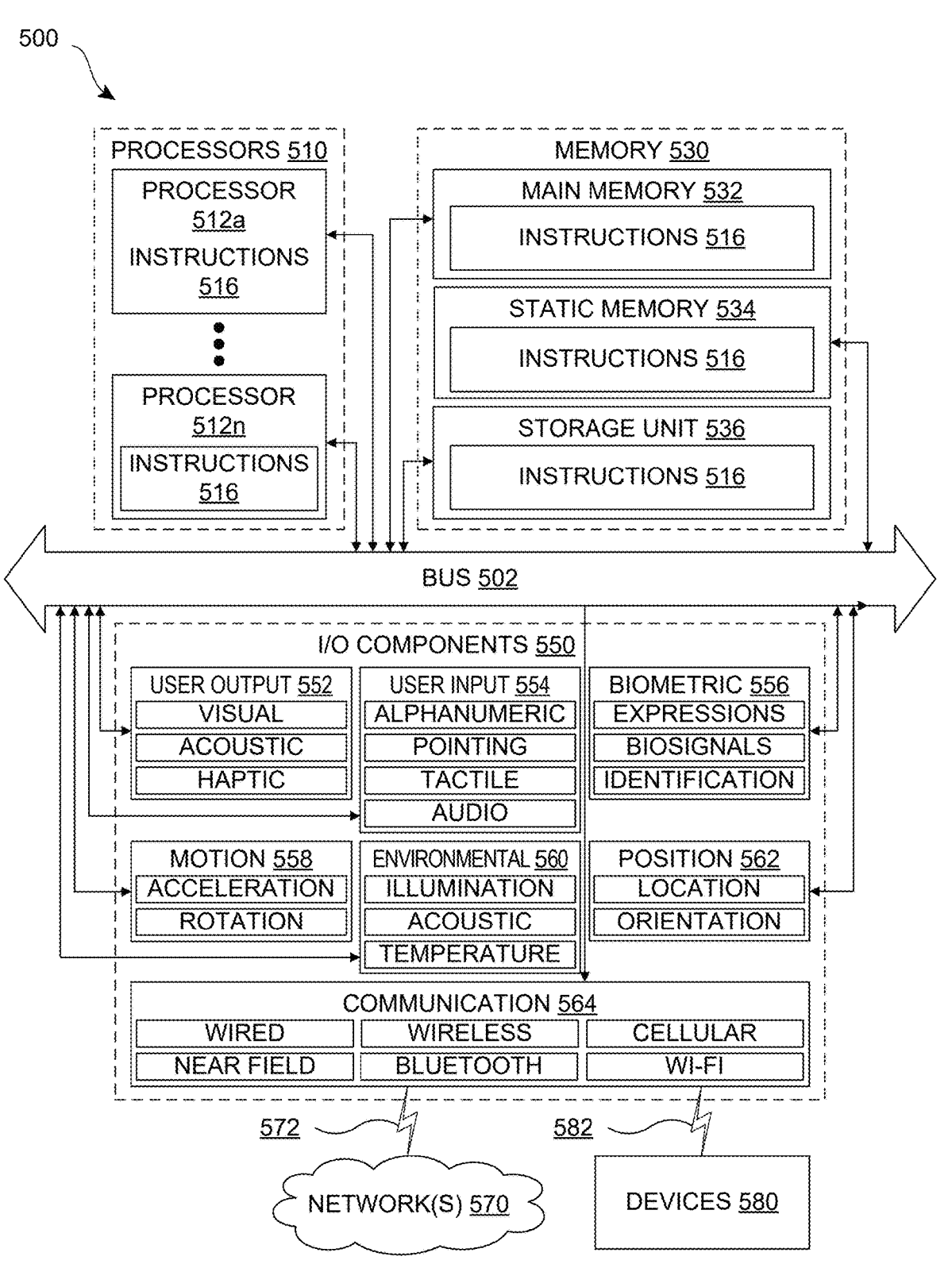
FIG. 5 is a block diagram illustrating components of an example machine configured to read instructions from a machine-readable medium and perform any of the features described herein.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement methods or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The particular examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560 and/or position components 562, among a wide array of other environmental sensor components. The biometric components 556 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 562 may include, for example, location sensors (for example, a Global Position System (GPS) receiver), altitude sensors (for example, an air pressure sensor from which altitude may be derived), and/or orientation sensors (for example, magnetometers). The motion components 558 may include, for example, motion sensors such as acceleration and rotation sensors. The environmental components 560 may include, for example, illumination sensors, acoustic sensors and/or temperature sensors.

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 564, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. A data processing system comprising:

a processor; and a memory in communication with the processor, the memory comprising executable instructions that, when executed by the processor alone or in combination with other processors, cause the data processing system to perform functions of:

receiving, by a query processing system, a query for data stored in a federated graph data storage system coupled to the query processing system, the query being received from a query caller via an intelligent query Application Programming Interface (API), the query including one or more components and the federated graph data storage system including a plurality of data stores, at least some of the plurality of data stores being disconnected;

mapping, by a mapping engine, each of the one or more components of the query to data entities of the federated graph data storage system using a schema, the schema expressing connections between the data entities of the federated graph data storage system and the schema including data classification labels for one or more of the data entities of the federated graph data storage system;

examining, by a detection engine, each of the one or more components of the query, to determine an identification of at least one of the one or more components to which a policy associated with the data stored in the federated graph data storage system applies, the identification being done at least based on the data classification labels associated with the data entities mapped to the one or more components;

generating, by a planning engine, a query plan, wherein the query plan provides information on how the query is to be executed in the federated graph data storage system;

selecting, by an enforcement engine, a transform mode from among a plurality of policy enforcement modes responsive to the identification;

transforming, by the enforcement engine, the query plan to comply with the policy including at least one of pruning the data entities subject to the policy or implementing a declassifying function in the query plan that transforms the data entities to which the policy applies in a manner that the data classification labels of the data entities is changed to a lower level classification label that complies with the policy; and executing, by a graph query execution engine, the query plan to retrieve results compliant with the policy and responsive to the query.

2. The data processing system of claim 1, wherein the executable instructions when executed by the processor alone or in combination with other processors, cause the data processing system to perform functions of:

retrieving geographical location information for at least one of the query caller, the data processing system and one or more target data stores that store the data that is a target of the query.

3. The data processing system of claim 2, wherein the intelligent query API provides a context used by the query to retrieve the geographical location information for the query caller and a target tenant.

4. The data processing system of claim 2, wherein identifying the one or more components includes determining if the one or more components are subject to a regional restriction based on the policy.

5. The data processing system of claim 1, wherein the policy is expressed in a policy predicate produced in code which defines which transfer operations are permitted on data items given varying data classification labels assigned to the data items.

6. The data processing system of claim 1, wherein the intelligent query API is an interface that communicates with the federated graph data storage system via the data processing system to respond to queries that relate to interdependence of the data entities in the federated graph data storage system.

7. The data processing system of claim 1, wherein the federated graph data storage system is subject to a plurality of policies, including one or more regional restrictions on transfer of the data between different geographical regions.

8. A method for implementing policy-based compliance enforcement in a federated graph data environment, comprising:

receiving, by a query processing system, a query for data stored in a federated graph data storage system coupled to the query processing system, the query being received from a query caller via an intelligent query Application Programming Interface (API), the query including one or more components and the federated graph data storage system including a plurality of data stores, at least some of the plurality of data stores being disconnected;

mapping, by a mapping engine, each of the one or more components of the query to data entities of the federated graph data storage system using a schema, the schema expressing connections between the data entities of the federated graph data storage system and the schema including data classification labels for one or more of the data entities of the federated graph data storage system;

examining, by a detection engine, each of the one or more components of the query, to determine an identification of at least one of the one or more components to which a policy associated with the data stored in the federated graph data storage system applies, the identification being done at least based on the data classification labels associated with the data entities mapped to the one or more components;

generating, by a planning engine, a query plan, wherein the query plan provides information on how the query is to be executed in the federated graph data storage system;

selecting, by an enforcement engine, a transform mode from among a plurality of policy enforcement modes responsive to the identification;

transforming, by the enforcement engine, the query plan to comply with the policy including at least one of pruning the data entities subject to the policy or implementing a declassifying function in the query plan that transforms the data entities to which the policy applies in a manner that the data classification labels of the data entities is changed to a lower level classification label that complies with the policy; and executing, by a graph query execution engine, the query plan to retrieve results compliant with the policy and responsive to the query.

9. The method of claim 8, wherein upon selecting an observe mode, the query plan and a report that details violation of the policy are generated.

10. The method of claim 8, wherein upon selecting a restrict mode:

either the query plan is not generated, or execution of the query plan is prevented; and a report that details violation of the policy is generated.

11. The method of claim 8, wherein the intelligent query API is an interface that communicates with the federated graph data storage system via the data processing system to respond to queries that relate to interdependence of the data entities in the federated graph data storage system.

12. The method of claim 8, wherein pruning the query plan includes removing the one or more components that are subject to the policy from the query plan.

13. A non-transitory computer readable medium on which are stored instructions that when executed cause a programmable device to perform functions of:

receiving, via a query processing system, a query for data stored in a federated graph data storage system coupled to the query processing system, the query being received from a query caller via an intelligent query Application Programming Interface (API), the query including one or more components and the federated graph data storage system including a plurality of data stores, at least some of the plurality of data stores being disconnected;

mapping, by a mapping engine, each of the one or more components of the query to data entities of the federated graph data storage system using a schema, the schema expressing connections between the data entities of the federated graph data storage system and the schema including data classification labels for one or more of the data entities of the federated graph data storage system;

examining, by a detection engine, each of the one or more components of the query, to determine an identification of at least one of the one or more components to which a policy associated with the data stored in the federated graph data storage system applies, the identification being done at least based on the data classification labels associated with the data entities mapped to the one or more components;

generating, by a planning engine, a query plan, wherein the query plan provides information on how the query is to be executed in the federated graph data storage system;

selecting, by an enforcement engine, a transform mode from among a plurality of policy enforcement modes responsive to the identification;

transforming, by the enforcement engine, the query plan to comply with the policy including at least one of pruning the data entities subject to the policy or implementing a declassifying function in the query plan that transforms the data entities to which the policy applies in a manner that the data classification labels of the data entities is changed to a lower level classification label that complies with the policy; and executing, by a graph query execution engine, the query plan to retrieve results compliant with the policy and responsive to the query.

14. The non-transitory computer readable medium of claim 13, wherein identifying the one or more components includes determining if the one or more components are subject to a regional restriction based on the policy.

15. The non-transitory computer readable medium of claim 13, wherein the policy is expressed in a policy predicate produced in code which defines which transfer operations are permitted on data items given varying data classification labels assigned to the data items.

16. The non-transitory computer readable medium of claim 13, wherein the intelligent query API is an interface that communicates with the federated graph data storage system via the data processing system to respond to queries that relate to interdependence of the data entities in the federated graph data storage system.

17. The non-transitory computer readable medium of claim 13, wherein pruning the query plan includes removing the one or more components that are subject to the policy from the query plan.

* * * * *